(No Model.)
A. H. WOOD.
KNOB ATTACHMENT.
No. 316,591. Patented Apr. 28, 1885.
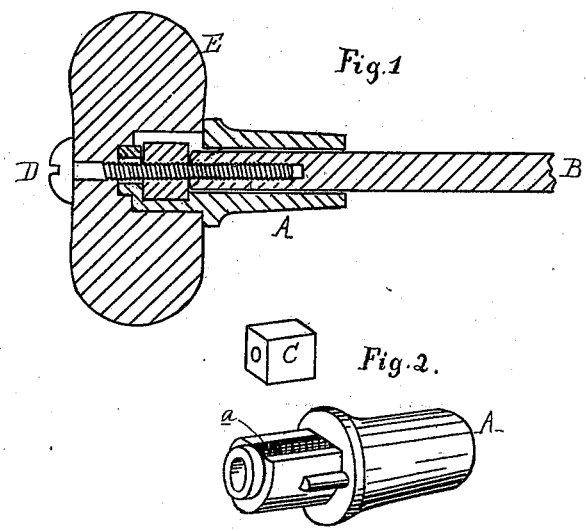
Attest:
John Schumann.
E. W. Andrews
Inventor:
Arthur H. Wood.
by his Atty
Thos. S. Sprague

UNITED STATES PATENT OFFICE.

ARTHUR H. WOOD, OF LANSING, MICHIGAN.

KNOB ATTACHMENT.

SPECIFICATION forming part of Letters Patent No. 316,591, dated April 28, 1885.

Application filed August 20, 1884. (No model.)

*To all whom it may concern:*

Be it known that I, ARTHUR H. WOOD, of Lansing, in the county of Ingham and State of Michigan, have invented new and useful Improvements in Knob Attachments; and I do hereby declare that the following is a full, clear, and exact description thereof, reference being had to the accompanying drawings, which form a part of this specification.

This invention relates to certain new and novel improvements in devices for attaching knobs to their spindles; and the invention consists in the peculiar combinations and the construction and arrangement of parts hereinafter more fully described and claimed.

Figure 1 is a vertical central longitudinal section. Fig. 2 is a detail perspective of the shank and nut.

In the accompanying drawings, which form a part of this specification, A represents the shank, the knob end of which is recessed, as at *a*, such recess being somewhat larger than the opening through which the spindle B passes. This recess is designed to receive the nut C, through which the screw D passes to engage with the threaded end of the spindle.

In practice one end of the spindle is provided with the stationary knob, as in the usual constructions in common use. The spindle is then inserted through the door and lock. The nut C is placed within the recess *a*, and the knob E placed upon the end of the shank, when the screw is inserted through the knob and the end of the shank and screwed into the nut. The opposite end of the shank is then placed upon the spindle, the screw then being turned in until the knob is securely locked upon the shank by means of the nut C, which draws the shank and knob together, and the whole is adjusted upon the spindle.

It will be observed that the nut has a little play within the shank, which allows it to adjust itself so that the screw can readily engage with the end of the spindle in a direct line, avoiding any torsional strain upon the parts, such as must necessarily occur where the screw is threaded through the end of the shank.

I am aware that it has been proposed to provide a sleeve with an opening in its side, as shown in the Patent No. 289,305, and that a wedge-shaped key has been inserted between the shank and wall of the sleeve, and do not claim such construction as forming part of my invention.

What I claim as my invention is—

1. In a door-knob, and in combination with the shank thereof having a recess in its side, a nut inserted in said recess between the end of the spindle and the opposite end of the recess, and held from lateral displacement in the action of the screw by means of a shoulder in the shank, substantially as and for the purposes described.

2. In a door-knob, the combination of the detachable shank A, having a recess, *a*, covered by the knob, spindle B, nut C, inserted in said recess, screw D, and knob E, all constructed, arranged, and operating substantially as and for the purposes set forth.

3. In a door-knob, the combination, with a detachable shank having a recess in its side, of a knob recessed to receive one end of said shank, a nut inserted in the recess in said shank and working within the recess in the knob, and a screw passing through said knob, shank, and nut and engaging with the spindle, substantially as and for the purpose specified.

ARTHUR H. WOOD.

Witnesses:
H. S. SPRAGUE,
E. W. ANDREWS.